T. DAVIS.
SHOCK ABSORBER.
APPLICATION FILED SEPT. 5, 1919.

1,337,346.

Patented Apr. 20, 1920.
2 SHEETS—SHEET 1.

WITNESSES

INVENTOR
Thomas Davis.
BY
ATTORNEYS

T. DAVIS.
SHOCK ABSORBER.
APPLICATION FILED SEPT. 5, 1919.
1,337,346.
Patented Apr. 20, 1920.
2 SHEETS—SHEET 2.
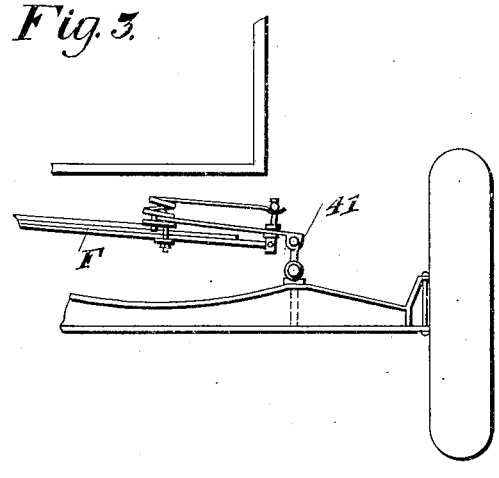
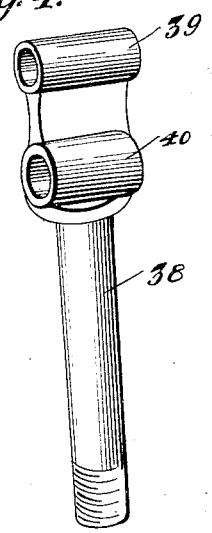
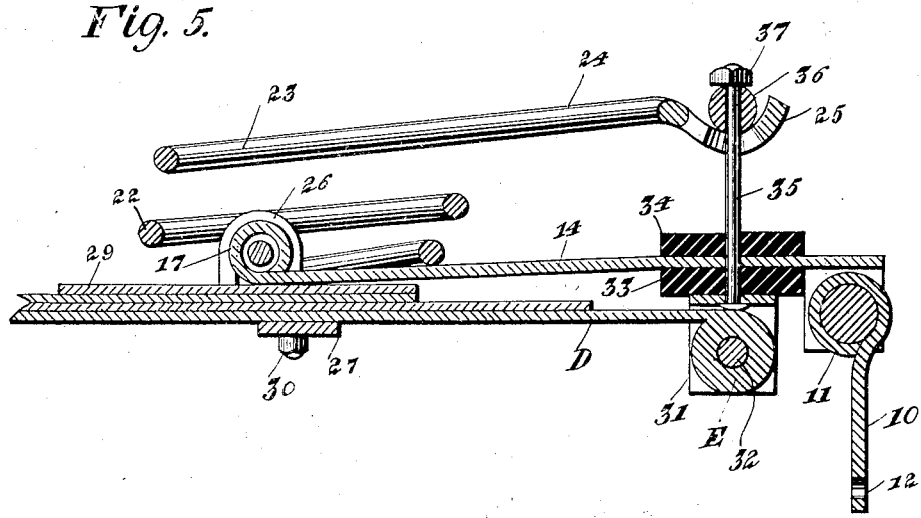
WITNESSES
INVENTOR
Thomas Davis.
BY
ATTORNEYS

UNITED STATES PATENT OFFICE.

THOMAS DAVIS, OF MOUNDS, OKLAHOMA.

SHOCK-ABSORBER.

1,337,346.  Specification of Letters Patent.  Patented Apr. 20, 1920.

Application filed September 5, 1919. Serial No. 321,776.

*To all whom it may concern:*

Be it known that I, THOMAS DAVIS, a citizen of the United States, residing at Mounds, in the county of Creek and State of Oklahoma, have invented new and useful Improvements in Shock-Absorbers, of which the following is a specification.

This invention relates to attachments for motor vehicles, particularly to shock absorbers, and has for its object the provision of an improved shock absorber for use upon motor vehicles of a very popular make provided with transverse front and rear springs, the device being in the nature of a coil spring including a plurality of horizontally disposed convolutions, the lower one of which is connected with a clamping member detachably engaged upon the vehicle spring and the upper one of which has formed thereon an arm which is spaced above the vehicle spring and connected therewith, novel means being provided for connecting the device with the rear hubs or with the front axle, as the case may be.

An important object is the provision of a shock absorber of this character which is so constructed as to afford the maximum resilience and flexibility so as to insure comfort to the occupants of the vehicle thus equipped.

An additional object is the provision of a shock absorber of this character which will be simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1:
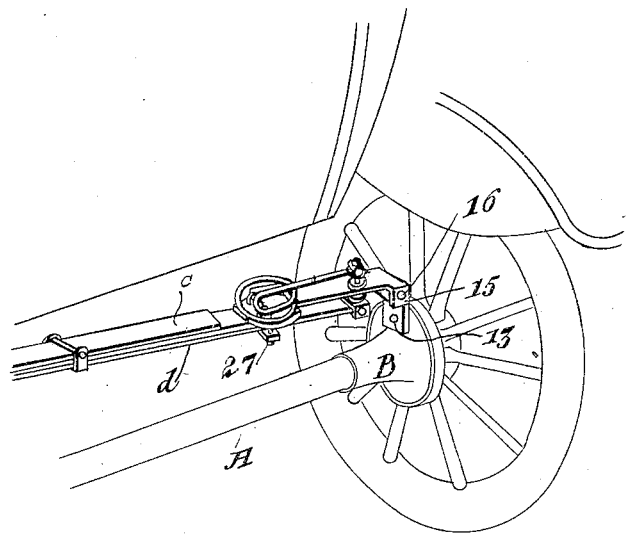
Figure 2:
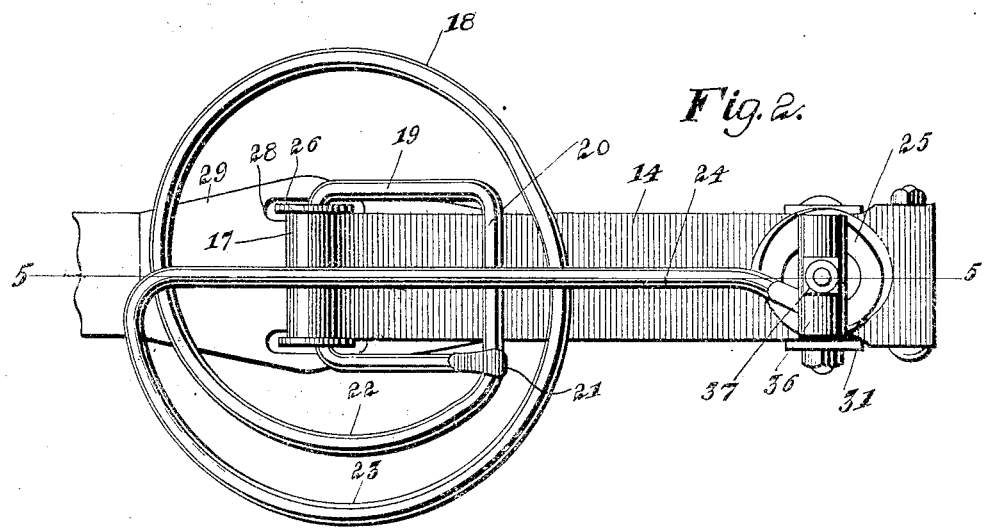

Figure 1 is a perspective view showing my device applied to one end of the rear spring of a vehicle, Fig. 2 is a plan view of my device, Fig. 3 is a front elevation showing my device applied to the front spring of a vehicle, Fig. 4 is a perspective view of the perch used in mounting the device upon the front axle, and Fig. 5 is a longitudinal sectional view on the line 5—5 of Fig. 2.

Referring more particularly to the drawings, the letter A designates the rear axle housing of an automobile, B designates the rear hub, and C designates the rear spring having the master leaf D.

In carrying out my invention I provide a bracket 10 formed preferably as a plate having its upper end formed as an eye 11. The lower end of this bracket 10 is provided with a hole 12 for the passage of the bolt 13 whereby this bracket may be secured upon the rear hub B to take the place of the spring hanger ordinarily provided at this point. I also make use of an elongated plate 14 which is formed initially of a T-shape and which has the ends of this hub portion bent downwardly to provide ears 15 arranged in straddling relation to the ends of the eye or loop 11. A bolt 16 passes through the ears 15 and through the eye 11. At its other end, the plate 14 is bent upon itself, as shown, to provide an eye 17, for a purpose to be described.

Mounted upon the plate 14 is a spring, designated broadly by the numeral 18, which is formed of round spring steel and which has one end extending through the eye 17 formed to provide a rectangular convolution 19 including a portion 20 which extends across and bears upon the top of the plate 14, the terminal of this convolution being flattened and secured to the portion 20, as shown at 21. Upon the convolution 19 and extending from the end of the portion 20 thereof, are convolutions 22 and 23 which are arranged vertically above each other and which progress in diameter. Formed upon the end of the convolutions 23 is an arm 24 which extends above the longitudinal axis of the spring C and plate 14 and this arm 24 has its terminal provided with a loop 25 which is concaved, as shown. The end of the plate 14 provided with the loop 17, is secured upon the vehicle spring C by means of U-bolts 26 which pass through a plate 27 extending transversely of the underside of the master leaf D, and these U-bolts extend upwardly through this plate 27 and through slots 28 formed in a plate 29 disposed upon the top of the spring C. The end of one arm of each U-bolt abuts against the top of the plate 29, while the end of the other arm extends below the plate 27 and carries a clamping nut 30. In this way the coil spring and also the plate 14 are held secured upon the vehicle spring.

I also make use of an inverted U-shaped yoke 31 which is disposed in straddling relation to the eye E formed on the end of the master leaf D and this yoke is secured in position by a bolt 32 which extends through the eye and through the ends of the yoke. I also provide upon the top of the yoke 31 a block 33 of rubber which engages against the underside of the plate 14, and I also employ a similar block 34 disposed upon the top of the plate 14. These blocks may be secured in place by suitable rivets or the like, not shown. Extending upwardly from the yoke 31 is a rod 35 which extends through the saddle 25 and through a bar 36 which is seated within the concavity of this saddle, the upper extremity of the rod 35 carrying an adjusting nut 37.

From a study of the drawings and the above description it will be seen that in applying my device to the rear vehicle spring the ordinary shackles which connect the ends of the master leaf with the hub are eliminated, my device forming the connection. It will, however, be observed that no changes are necessary to be made in the spring itself, it being only the mounting which is different.

In applying my device to the front spring F of the vehicle I replace the ordinary spring perch with a specially constructed perch 38 which is the same as the ordinary perch except that the eye member 39 at the upper end thereof is disposed vertically above the eye member 40 through which the end of the radius rod passes. In applying my device to the front spring and axle, the ears 15 on the end of the plate 14 are straddled upon the ends of the eye portion 39 formed at the top of the perch 38 and a suitable bolt 41 is provided for holding the parts assembled. It will be observed that in the front construction the ordinary spring shackles are eliminated just the same as in the rear construction, my device forming efficient means for connecting the vehicle spring with either the front axle or the rear hub portion, as the case may be.

In the operation of my device it will be seen that when a sudden strain comes upon the spring of the vehicle the rod 35 will be pulled downwardly, moving the spring arm 24 downwardly. This movement of course is resisted by the coil spring and great flexibility is thus assured. It will be observed that my construction is such that the rebound from a jar or shock will also be checked so as to insure easy riding qualities. The provision of the rubber blocks 33 and 34 is considered important as the former serves as a buffer when a sudden rebound takes place and the latter serves as a buffer engaged by the saddle member 25 when excessive strain is put upon the spring arm 24. It is of course apparent that the operation at the front and rear springs is exactly the same, the mounting alone being slightly different.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:—

1. A shock absorber comprising an elongated plate having one end provided with depending ears and having its other arm formed as an eye, said plate being disposed upon the top of a transverse vehicle spring, a bracket member pivoted between said ears and conected with the rear brake casing, a coil spring formed as a plurality of convolutions of increasing size disposed one above the other, the lowermost convolution being rectangular in shape and engaging through said eye and including a portion extending transversely of and bearing upon the top of said plate, a plate disposed upon the top of the vehicle spring beneath said plate, a plate disposed beneath the vehicle spring in transverse relation thereto, U-bolts extending through said last named plate, through slots in said second named plate and engaging the portion of said rectangular convolution passing through said eye, an inverted U-shaped member arranged in straddling relation to and pivotally connected with the eye formed at the end of the master leaf of the vehicle spring, a rod extending upwardly from said yoke and disposed slidably through said first named plate, an arm formed on the end of the uppermost spring convolution and terminating in a saddle member through which said rod extends, and a transverse member engaged upon the upper end of said rod and seating within said saddle member.

2. A shock absorber for vehicles comprising an elongated plate adapted for connection at one end with the spring hanger of the vehicle, an eye formed at the other end of said plate, a coil spring having a plurality of convolutions disposed one above the other, the lowermost convolution being rectangular in form and including one portion engaging within said eye and another portion disposed transversely of and bearing upon said plate, means for securing said plate with respect to the vehicle spring, a spring arm formed on the uppermost convolution and extending in spaced relation to said plate with its terminal formed as a saddle member, an upstanding rod connected with the end of the master leaf of the vehicle spring and extending through said plate and said saddle member, and a transverse retaining member engaging upon said saddle member and secured upon the upper end of said rod.

3. A shock absorber comprising a plate formed at one end for pivotal connection with a portion of a vehicle front axle housing, the other end of said plate being formed as an eye, a coil spring disposed upon said plate and including a plurality of convolutions disposed one above the other, the lowermost convolution having a portion extending through said eye and another portion engaging upon the top of said plate, means engaging said lowermost convolution for holding the spring and said plate upon the vehicle spring, a spring arm formed on the uppermost convolution and extending in spaced relation to and above said plate, a rod connected with the end of the master leaf of the vehicle spring and extending through said plate, and a member carried by the upper end of said rod and engaging the end of said arm.

THOMAS DAVIS.